May 2, 1961 T. P. HECKMAN 2,982,712
BOILER–SUPERHEATER REACTOR
Filed Aug. 8, 1958 6 Sheets-Sheet 2

INVENTOR.
Thomas P. Heckman
BY Roland A. Anderson
Attorney

May 2, 1961 T. P. HECKMAN 2,982,712
BOILER-SUPERHEATER REACTOR
Filed Aug. 8, 1958 6 Sheets-Sheet 3
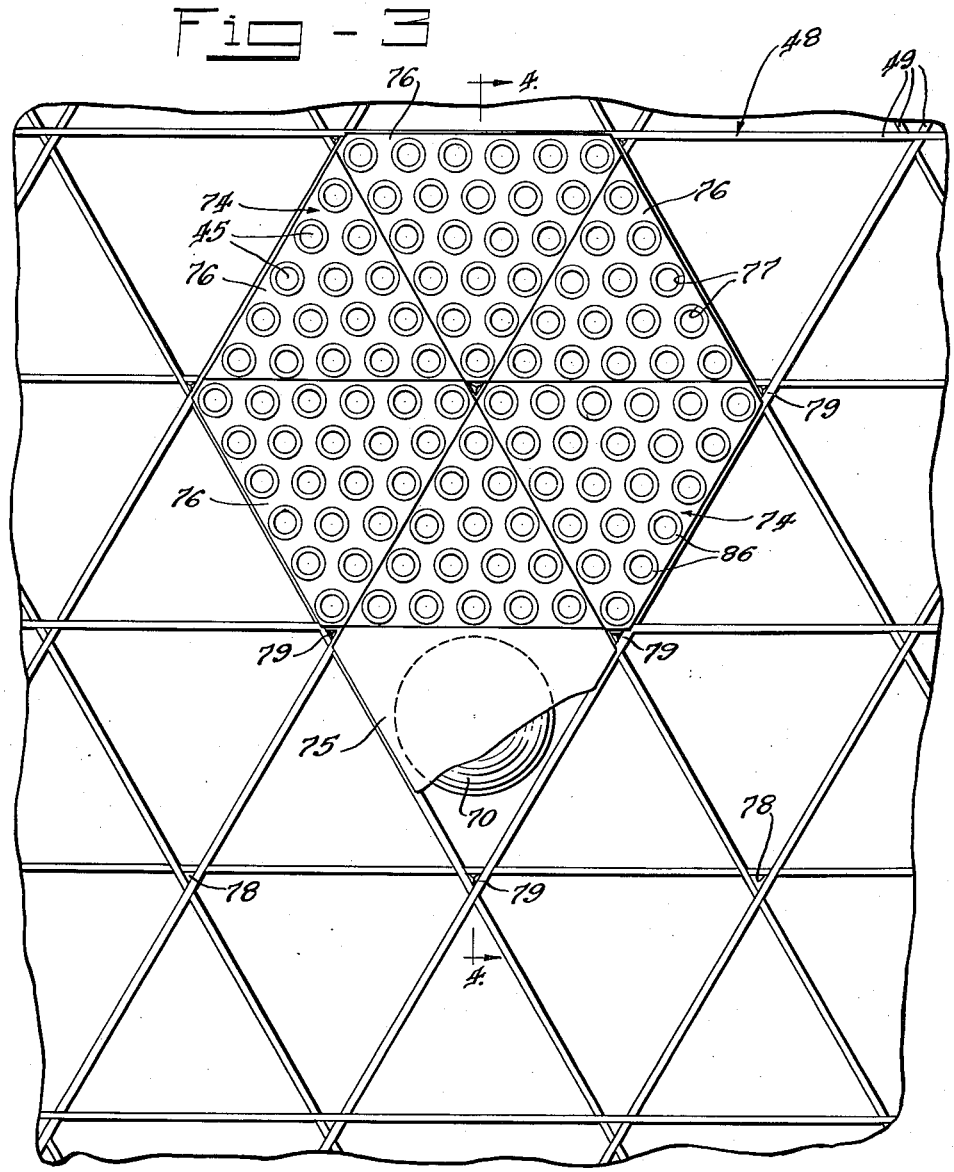
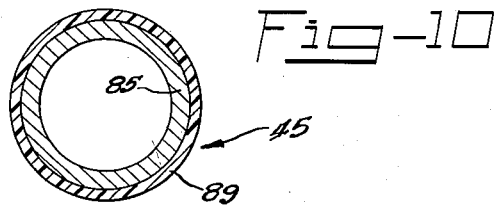
INVENTOR.
Thomas P. Heckman
BY Roland A. Anderson
Attorney

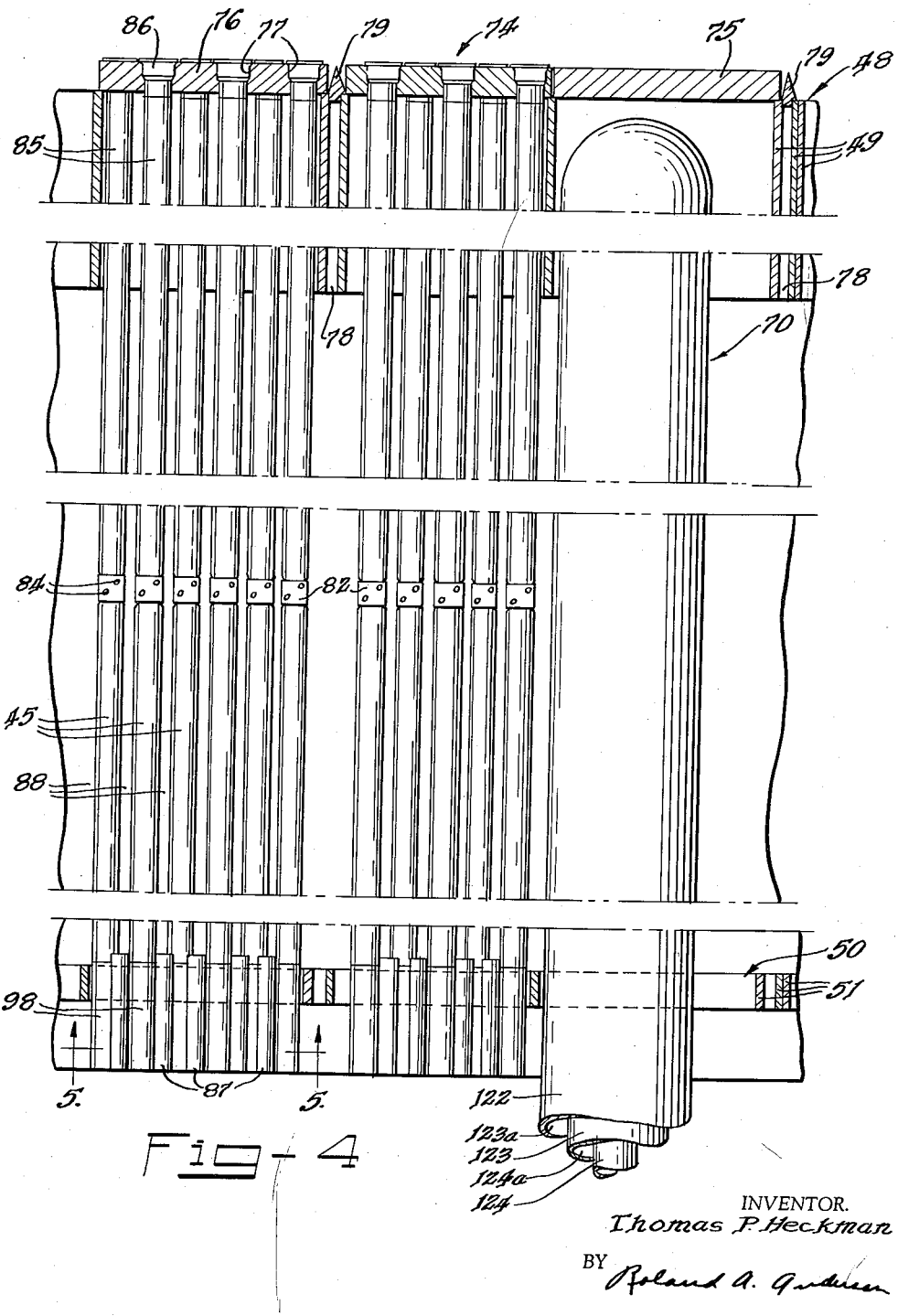

May 2, 1961 T. P. HECKMAN 2,982,712
BOILER-SUPERHEATER REACTOR
Filed Aug. 8, 1958 6 Sheets-Sheet 5
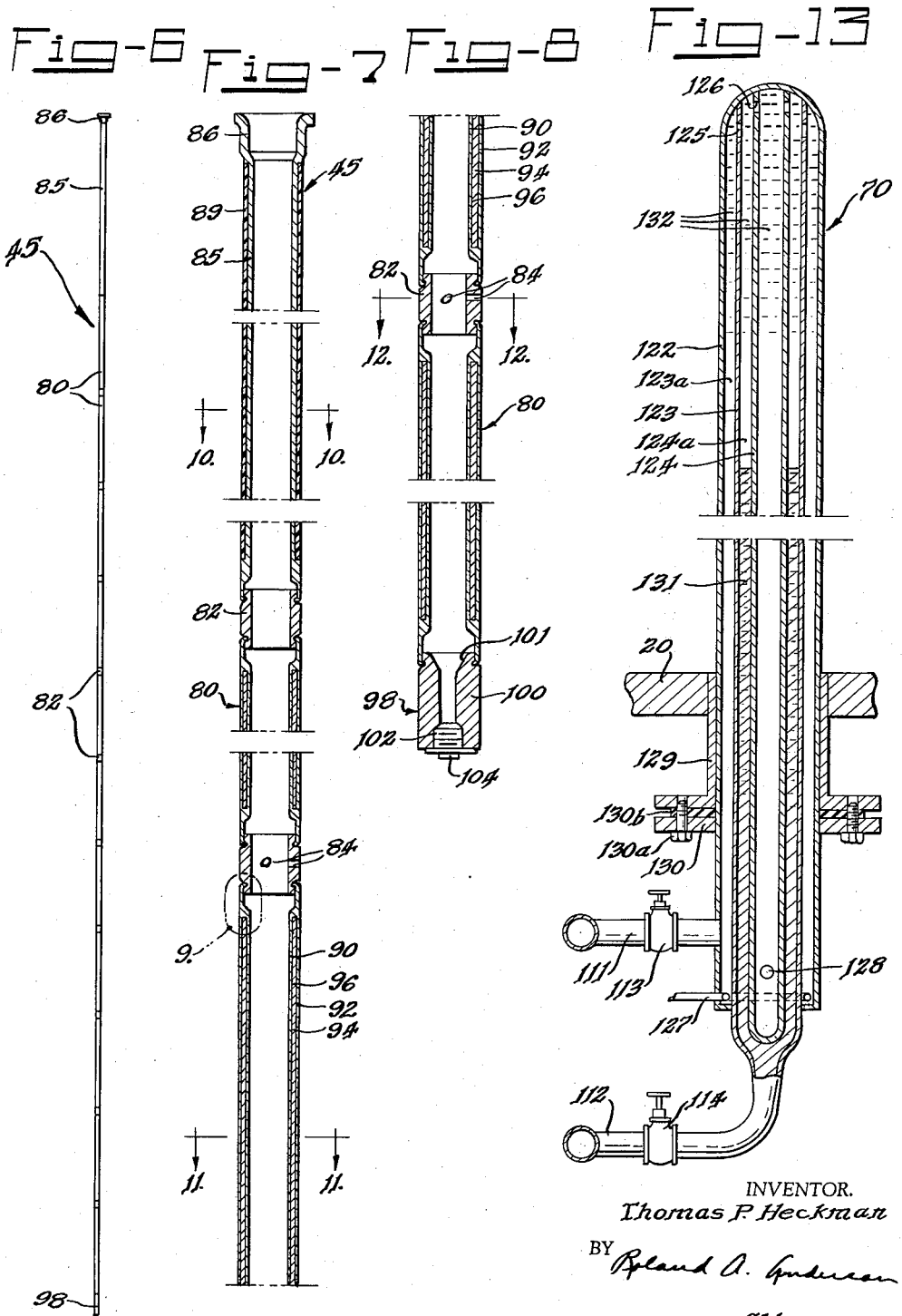
INVENTOR.
Thomas P. Heckman
BY Ryland A. Anderson
Attorney May 2, 1961 T. P. HECKMAN 2,982,712
BOILER-SUPERHEATER REACTOR
Filed Aug. 8, 1958 6 Sheets-Sheet 6
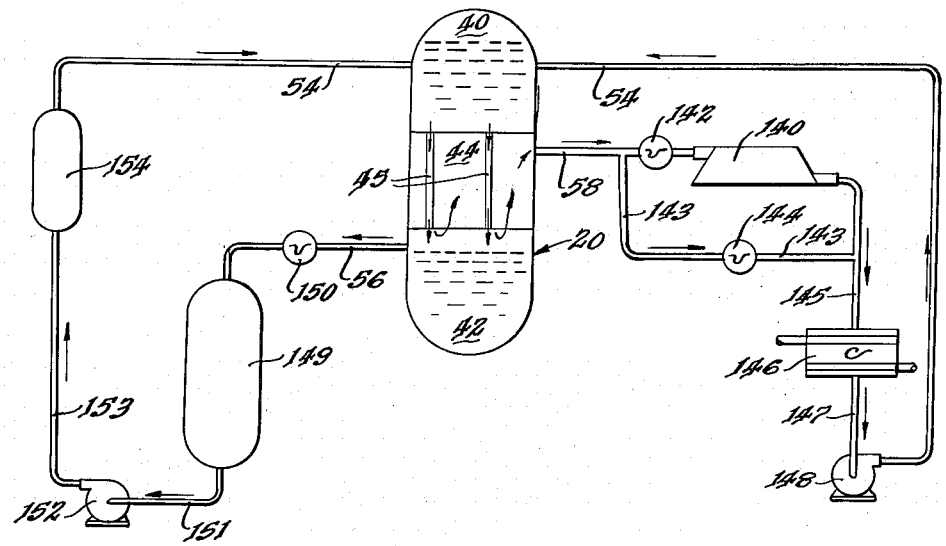
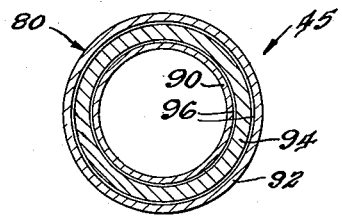
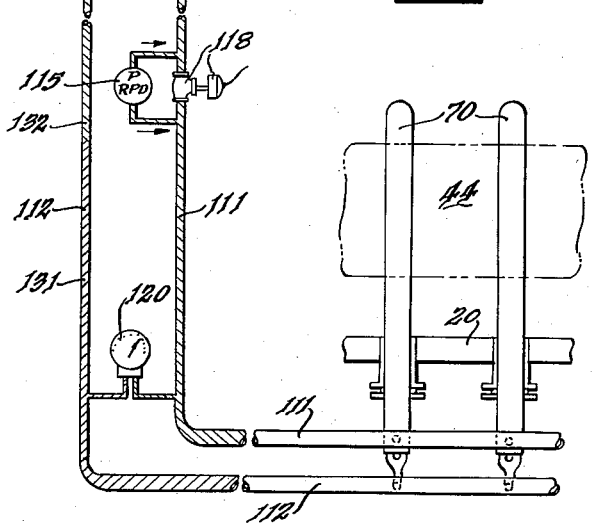
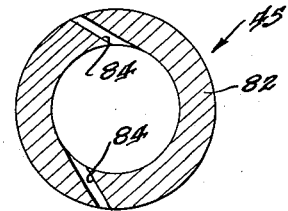
INVENTOR.
Thomas P. Heckman
BY Roland A. Anderson
Attorney

United States Patent Office 2,982,712
Patented May 2, 1961

2,982,712

BOILER-SUPERHEATER REACTOR

Thomas P. Heckman, Lombard, Ill., assignor, by mesne assignments, to the United States of America as represented by the United States Atomic Energy Commission Filed Aug. 8, 1958, Ser. No. 754,114

6 Claims. (Cl. 204—193.2)

This invention relates to nuclear reactors. More particularly, it relates to a nuclear power reactor of the type in which a liquid moderator-coolant is transformed by nuclear heating into a vapor which may be used to drive a turbo-generator.

At the present time, nuclear reactors of many types have been designed, constructed, and successfully operated. One of the more recently developed species of nuclear reactors which has found wide acceptance for the conversion of nuclear energy into electrical energy is the boiling water reactor. The boiling water reactor has won acclaim as a significant advance in reactor technology because it has eliminated the necessity for a heat exchanger, thereby lending increased efficiency to the energy conversion process for which nuclear power reactors are intended. However rewarding the boiling water reactor has been and as promising as the future of such reactors may be, there presently exist certain rather marked disadvantages to such devices.

One such disadvantage inherent in present boiling water reactors involves the maintenance of stability therein, i.e. the control of reactivity at a preset power level. Since the liquid moderator-coolant is permitted to boil in a boiling water reactor, a mixture of steam and water in the reactor core is brought about as nuclear heating takes place, with a consequent change in the degree of neutron moderation and reactivity. The many variables present, such as vapor-to-liquid ratio, moderator-to-fuel ratio, pressure, temperature, and flow rate, among others, which evolve from the boiling phenomenon, all contribute to reactor instability and the necessity for rapid and continuous control of the nuclear chain reaction.

Another limitation of present boiling water reactors is their inverse response to the power demand of the turbo-generators to which they supply steam. As the electrical power demand on the generator coupled to a boiling water reactor is increased, the turbine that drives the generator must be supplied with more steam; opening the throttle from the boiling water reactor to the turbine to admit more steam to the latter decreases the pressure within the reactor, thereby increasing the steam-to-water ratio therein and lowering the reactivity due to a decrease in neutron moderation and an increase in neutron leakage from the reactor core. Thus the unattended response of a boiling water reactor is inverse to the desired response, since, as more steam is demanded of the reactor, its reactivity and power level are lowered.

Still another limitation of present boiling water reactors is the relatively large volume of liquid that must be cycled for a given quantity of steam production. The circulation of liquid consumes energy in the pumping apparatus used for such circulation; this energy is usually electrical in form and is obtained from the output of the generator driven and, therefore, at the expense of the net output of the conversion process, thereby detracting directly from the net efficiency of the energy conversion process. For this reason, present boiling water reactors, although gaining in efficiency from the absence of heat exchangers, have been forced to sacrifice much of this gain due to the relatively high liquid circulation requirements heretofore inherent in such devices.

A further encumbrance on present boiling water reactors, as well as on all other heterogeneous nuclear reactors, is the frequency and gravity of fuel element failures. Perhaps this problem presents the most aggravating impedance to the reception of nuclear devices as feasible energy sources by the electric utility field. More time, effort, and funds have been expended to develop satisfactory fuel elements for heterogeneous nuclear reactors, possibly, than for any other single aspect of nuclear reactor technology since its inception in recent years. In spite of this fact, fuel elements remain vulnerable to failure due to nuclear growth, temperature expansion, structural stresses and strains, erosion and corrosion by coolants, bowing, twisting, localized heating, and a host of other causes.

The nuclear reactor of the present invention substantially eliminates the aforesaid limitations of present boiling water reactors while retaining the advantages thereof. This is accomplished in the present invention by the incorporation of a core comprising a plurality of freely suspended tubular fuel elements, hereinafter called fuel element trains, within which nonboiling pressurized liquid moderator-coolant is preheated and subsequently sprayed or aspirated through orifices in the walls of the trains against the outer walls thereof to be converted into vapor. Passage of vapor so formed over other unwetted portions of the outside of the fuel elements subsequently causes the steam to be superheated. Functionally, the novel nuclear reactor disclosed herein always maintains the moderator-coolant within the fuel elements in the liquid state, and the moderator-coolant between the fuel elements substantially in the vapor state.

In addition to overcoming the major disadvantages of present boiling water reactors while retaining the advantages thereof, i.e. the obviation of the necessity for a heat exchanger and inherent safety, the present invention also embodies a fuel element structure and disposition which will markedly reduce and/or tolerate fuel element failure; this end is achieved by providing a plurality of tubular fuel element trains which are suspended from their upper ends and which contain liquid at a higher pressure than the environment external to the trains. Additionally, each fuel element train consists of a plurality of fuel elements coupled in tandem by connectors to preclude damage to the entire train should a localized failure in the train occur.

It is an object of the present invention, therefore, to provide a safe, efficient, and relatively uncomplicated device for the conversion of nuclear energy into electrical energy.

Another object of the present invention is to provide a nuclear reactor which is stable under varying conditions, including power demand, temperature, and pressure.

It is also an object of the present invention to provide a nuclear reactor whose unattended reactivity will respond directly rather than inversely to the power demand placed on the nuclear reactor.

A further object of the present invention is to provide a nuclear reactor having a circulating fluid moderator-coolant in which a portion of the moderator-coolant is transformed from the liquid to the vapor state and made to directly drive a turbo-generator.

Still another object of the present invention is to provide a nuclear reactor of the type just described in which a minimum of liquid moderator-coolant is circulated in relation to the quantity of moderator-coolant transformed from the liquid to the vapor state.

It is also an object of the present invention to provide a nuclear reactor of the type just described which employs fuel elements utilizing natural or low-enrichment fuel materials and capable of tolerating the physical, chemical, and nuclear forces which prevail in nuclear reactors without impairing the operation or adversely affecting the nuclear characteristics thereof.

Another object of the present invention is to provide a nuclear reactor of the type just described which incorporate a unique and elegant liquid neutron-absorber control system.

Other objects of the present invention will unfold upon perusal of the following detailed description and the attached drawings in which:

Fig. 3 is an enlarged fragment of Fig. 2 showing a number of triangular fuel assemblies and a tubular column for liquid neutron-absorber;

Fig. 4 is a vertical sectional view taken along lines 4—4 of Fig. 3;

Fig. 6 is an elevational view of one of the fuel element trains showing a plurality of fuel elements connected in tandem;

Fig. 7 is a vertical sectional view of the upper portion of Fig. 6;

Fig. 8 is a vertical sectional view of the lower portion of Fig. 6;

Fig. 10 is a horizontal sectional view taken along lines 10—10 of Fig. 7;

Fig. 11 is a horizontal sectional view taken along lines 11—11 of Fig. 7;

Fig. 12 is a horizontal sectional view taken along lines 12—12 of Fig. 8;

Fig. 13 is a vertical sectional view of one of the tubular columns for liquid neutron-absorber showing the construction thereof in detail;

Fig. 14 is a schematic diagram of the liquid neutron-absorber control system which is used to regulate the reactivity of the nuclear reactor of the present invention; and Fig. 15 is a schematic diagram of the over-all energy conversion system of the present invention showing a nuclear reactor, a turbo-generator, a condenser, and the fluid circulating system associated therewith.

Figure 1:
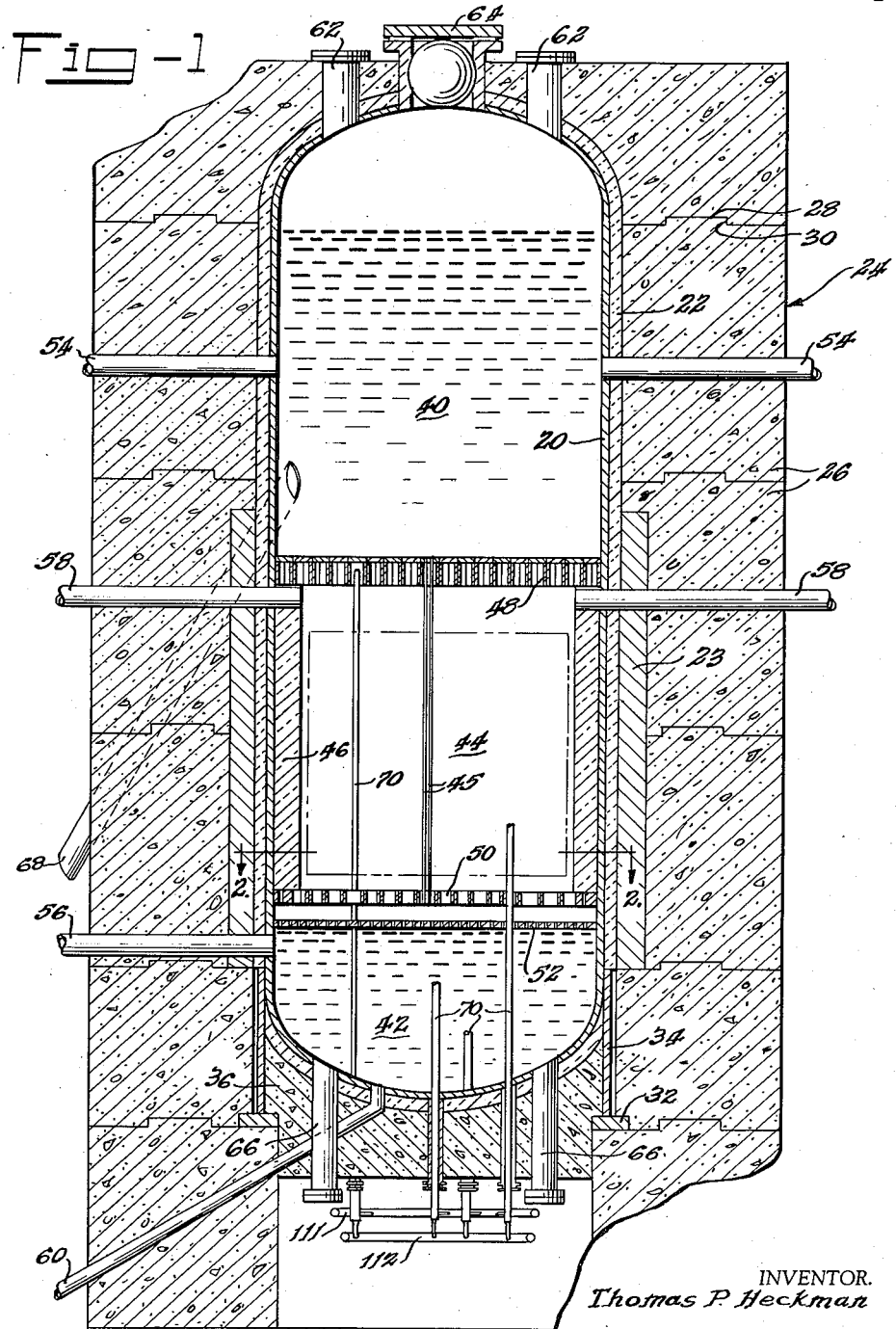
Fig. 1 is a vertical sectional view of the nuclear reactor of the present invention showing a shielded pressure vessel divided into an upper plenum, a core, and a lower plenum.

Referring now to Fig. 1, a closed cylindrical pressure vessel 20, which may be of stainless steel, having curved upper and lower ends is shown in a vertical position. Immediately surrounding and enclosing vessel 20 is a thermal shield 22 which may be a blanket of glass fiber or some other heat-insulating material. An annular blast shield 23 which may be of heavy gauge steel is provided about the middle portion of vessel 20. Surrounding and enclosing vessel 20 and shields 22 and 23 is a biological shield 24 which may be made of concrete and steel or some other type of radiation-attenuating material. Biological shield 24 consists of a plurality of annuli 26 which are stacked upon one another, the uppermost annulus 26 being extended inwardly toward its center to provide a biological shield at the top of vessel 20. Each annulus 26 has an annular step 28 provided along its upper surface and an annular groove 30 provided along its lower surface so that adjacent annuli 26 may interlock with one another to prevent radiation leakage from vessel 20 to the region surrounding the vessel. Mounted on the inner periphery of the lowermost annulus 26 is a steel ring 32 above which is an annular steel stool 34 which is joined to the ring; the stool is also joined as by welding to vessel 20 at the lower portion thereof. Mounted on ring 32 within stool 34 and within the two lowermost annuli 26 is a concrete nest 36 which provides a lower biological shield and a horizontal supporting member for vessel 20. Nest 36 has a plurality of openings through which various elements extend, the nature of such elements to be explained subsequently.

Vessel 20 is divided generally into three sections, an upper plenum 40, a lower plenum 42 and a core 44 disposed therebetween. Two of a plurality of fuel element trains 45, to be described later, are shown within core 44. Surrounding the core 44 within vessel 20 is a neutron reflector 46 which may be of graphite. Core 44 is supported within vessel 20 by an upper grid 48 from which the core depends in the vessel toward lower plenum 42. Core 44 is laterally confined and reflector 46 is supported by a lower grid 50. Upper grid 48 and lower grid 50 each consist of a plurality of interlocking transversely disposed steel slabs 49 and 51, respectively, that are supported by joining to the interior of vessel 20. A screen 52 which is adapted to carry instrumentation for monitoring conditions within vessel 20 is horizontally disposed between the upper portion of lower plenum 42 and lower grid 50, the screen being joined to the interior of vessel 20. A moderator inlet conduit 54 is shown connected to vessel 20 at upper plenum 40 and a moderator outlet conduit 56 is shown connected to the lower portion of the vessel 20 at lower plenum 42. At the upper portion of core 44, connected to vessel 20 just below upper grid 48 is a steam outlet conduit 58. A drain pipe 60 is shown connected to the lowermost portion of vessel 20 in communication with lower plenum 42. At the upper extremity of vessel 20 are shown a plurality of fuel charging ports 62 arrayed about a viewing port 64, while at the lower portion of the vessel are shown a plurality of access ports 66 through which instrumentation for monitoring conditions in the vessel may be inserted. Leading from upper plenum 40 is a valved fuel discharge tube 68 through which spent fuel may be removed from vessel 20.

Figure 2:
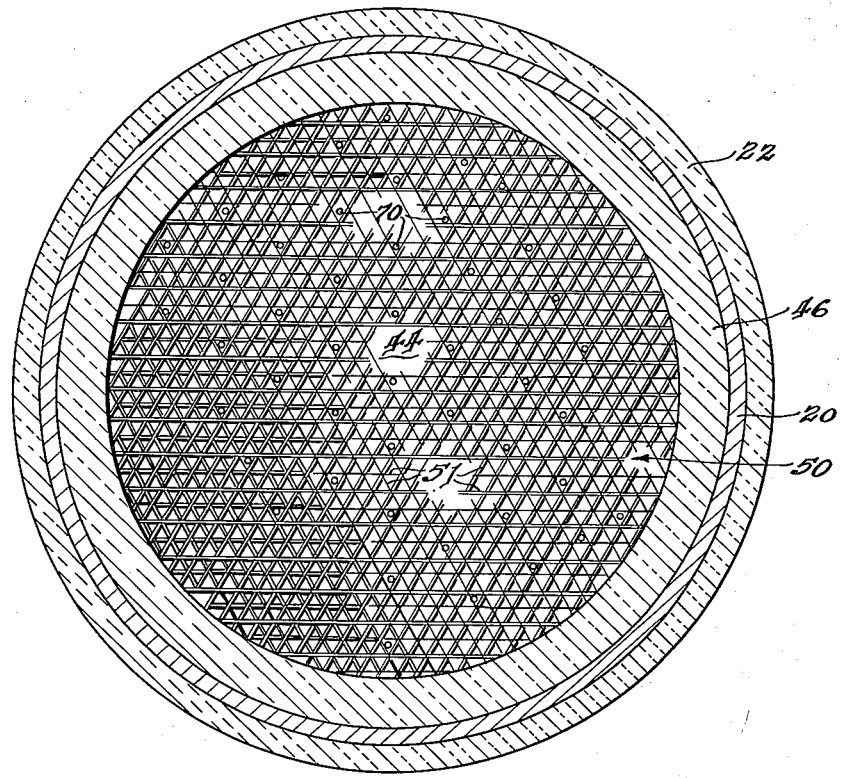
Fig. 2 is a horizontal sectional view taken along line 2—2 of Fig. 1.

Referring now to Fig. 2, a plurality of control units in the form of tubular columns 70 adapted to contain a liquid neutron-absorber are shown disposed among a plurality of triangular fuel assemblies 74 illustrated in plan view. As shown in Fig. 3, a solid triangular cover 75 is mounted above each tubular column 70 on upper grid 48 and is joined thereto to separate upper plenum 40 from the region adjacent to the tubular column.

Figure 5:
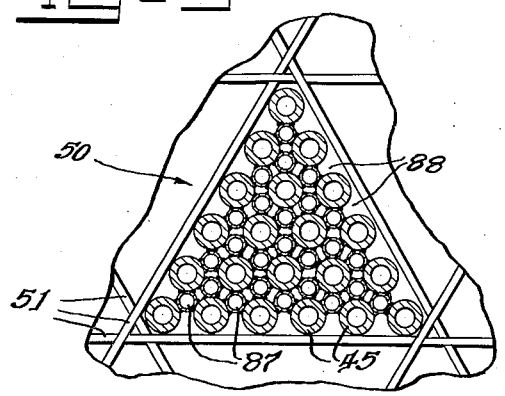
Fig. 5 is a horizontal sectional view taken along line 5—5 of Fig. 4.

As shown in Figs. 4 and 5, triangular fuel assemblies 74 each consist of a plurality of parallel fuel element trains 45 held in fixed spaced relationship by a triangular plate 76 at the upper end of the fuel assembly, the plates being positioned to rest along their edges on slabs 49 of upper grid 48. Each plate 76 has a plurality of tapered holes 77 provided therein from which trains 45 depend as illustrated in Fig. 4. Trains 45 are arrayed with their axes falling on the corners of a plurality of abutting equilateral triangles as shown in Fig. 3. The upper ends of trains 45 are joined to plates 76 at holes 77. Slabs 51 of lower grid 50 maintain the lower ends of fuel assemblies 74 in a parallel spaced relationship.

Due to the interlocking relationship of slabs 49 in upper grid 48, a plurality of openings 78 are formed at the corners of fuel assemblies 74 in upper grid 48. Triangular spikes 79 fill the upper portions of openings 78, the pointed end of the spikes being an enlarged cone extending upwardly from slabs 51 and resting thereon. Spikes 79 function to position fuel assemblies 74 on upper grid 48 and to close openings 78.

As previously noted with reference to Fig. 4, which shows a pair of fuel assemblies 74 in elevation and one tubular column 70 which contains liquid neutron-absorber, each fuel assembly 74 consists of a plurality of trains 45. Each train 45 consists of a plurality of fuel elements 80 that are coupled in tandem to one another by a plurality of tubular connectors 82, some or all of which have one or more orifices 84 provided in the sides thereof. Connected to the uppermost fuel element 80 in each train 45 is a guide tube 85, the upper end of which is formed into a flare 86 which is joined at tapered hole 77 to plate 76 to act as a hanger for train 45. In Figs. 4 and 5 are shown a plurality of short tubular spacers 87 disposed between and joined to trains 45 to provide spacing therebetween. A plurality of spaces or voids 88, best seen in Fig. 4, are formed between the trains by virtue of spacers 87 at the lower ends thereof and by plates 76 at the upper ends thereof.

Referring now to Fig. 7, the construction of a train 45 is shown in detail. Guide tube 85 has a layer of thermal insulation 89 disposed thereabout. Each fuel element 80 consists of an inner sheath 90, an outer sheath 92, and a tube of fuel material 94 which is disposed between the inner and outer sheaths and is in intimate contact therewith by virtue of a bonding agent 96. Although not visible from the drawings, the tube of fuel material 94 is provided with longitudinal striations or grooves along its surface to weaken the fuel tube and enable it to yield to stresses and strains caused by the fission process; in this way, sheaths 90 and 92 are saved from distortion. Inner and outer sheaths 90 and 92 may be of zirconium or stainless steel, fuel material 94 may be of natural or low-enrichment uranium, and bonding agent 96 may be sodium or a sodium-potassium alloy. Other equally suitable materials may be used for these elements. Connected to the lowermost fuel element 80 in each train 45 is a nozzle 98, best seen in Fig. 8, which consists of an annular housing 100 which has a tapered opening 101 and an enlarged lower end 102 in which is disposed a thermostatic gate 104 which is joined to the housing. Thermostatic gate 104 is responsive to temperature to open and close and provide a passage of varying size between the interior of train 45 and lower plenum 42.

Figure 9:
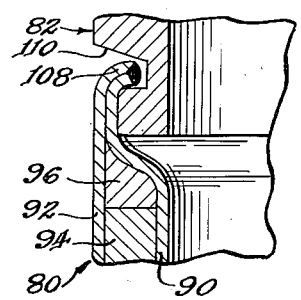
Fig. 9 is an enlargement of the encircled area designated in Fig. 7.

Referring now to Fig. 9, the joint between a connector 82 and a fuel element 80 is shown in detail. Each fuel element 80 has its inner and outer sheaths 90 and 92, respectively, brought together at the ends thereof, joined as by welding, and swaged inwardly to form interior annular lips 108 at the ends of the fuel element. Each connector 82 has an annular recess 110 at each end on the outer surface thereof, the recesses being adapted to receive lips 108; the lips are formed with the fuel elements and connectors in assembled position to effect a permanent lock therebetween. If desired, lips 108 may be welded to connector 82 at recesses 110; however, a tight seal in this region is not essential as will be seen later.

Referring now to Fig. 13, each of the tubular columns 70 which contain liquid neutron-absorber is seen to be connected to a conduit 111. Conduit 111 is adapted to contain a suitable pressurized fluid, such as heavy water. Also shown in Fig. 13 is a conduit 112 which is adapted to contain an efficient liquid neutron-absorber, such as a mercury-cadmium alloy, conduit 112 also being connected to each tubular column 70. A valve 113 is provided between each tubular column 70 and conduit 111 and a valve 114 is provided between each tubular column 70 and conduit 112.

The control system for the present invention is best seen in Fig. 14 where vertically disposed portions of conduits 111 and 112 are shown to extend to a height greater than tubular columns 70. Connected between conduits 111 and 112 at the upper vertical portions thereof is a reversible pump 115; a tank 116 adapted to contain the same liquid as conduit 111 is connected thereto above pump 115. Pump 115 is operable to force liquid downwardly in the vertical portion of conduit 112 thereby forcing liquid neutron-absorber upwardly in tubular columns 70 within core 44, or the pump can be made to force liquid downwardly in the vertical portion of conduit 111 thereby forcing neutron-absorber downwardly in the tubular columns. The details of this operation are set out in more detail below. A scram valve 118 is connected between the ends of the vertical portions of conduits 111 and 112 in parallel with pump 115, the valve being operable to permit the liquid in the conduits to flow in circumvention of the pump. A position indicator 120 is shown connected between conduits 111 and 112 at the lower vertical portions thereof, a hydrostatic pressure difference within the vertical portions of conduits 111 and 112 at the level of the position indicator causing actuation thereof.

Referring now to Fig. 13, a tubular column 70 is shown in detail. Each tubular column 70 consists of an outer tube 122, a median tube 123 within outer tube 122 and spaced therefrom to form an annular space 123a therewith, and an inner tube 124 within median tube 123 and spaced therefrom to form an annular space 124a therewith. Outer tube 122 is closed at its upper end and is in communication with conduit 111 at its lower end, median tube 123 is closed at its upper end by joining to the interior of the outer tube and is in communication with conduit 112 at its lower end, and inner tube 124 is closed at both ends, the upper end being joined to the interior of the outer tube. It will be noted that median tube 123 has perforations 125 in the upper portion thereof to provide communication between space 123a and space 124a. Perforations 126 are also provided in the upper portion of inner tube 124 to provide communication between the interior thereof and spaces 123a and 124a. A coolant inlet 127 and coolant outlet 128 are connected, respectively, to outer tube 122 and inner tube 124 at the lower portions thereof. Each tubular column 70 is mounted within core 44 and vessel 20 by virtue of a flanged sleeve 129 through which the tubular column passes at the bottom of the reactor, the sleeve being secured as by welding to the vessel. Joined to the exterior of outer tube 122 of tubular column 70 is an annular member 130 through which pass bolts 130a which are threaded into flanged sleeve 129 to rigidly secure tubular column 70 in position within vessel 20. A gasket 130b between sleeve 129 and member 130 prevents any leakage of liquid. As will be noted, the lower portion of space 124a contains an efficient neutron-absorbing liquid 131, such as a mercury-cadmium alloy, said neutron-absorbing liquid being supplied to space 124a through conduit 112 which is connected to the lower end of median tube 123. The upper portion of space 124a contains a pressurized fluid 132 which is immiscible with neutron-absorbing liquid 131, such as heavy water, as does space 123a. There is a continuous mass of fluid 132 from space 123a to the upper portion of space 124a by virtue of perforations 125 in the upper end of median tube 123. Fluid 132 is supplied to and removed from tubular column 70 through conduit 111 to effect a rising and falling of neutron-absorbing liquid 131 within the column. Since the densities of neutron-absorbing liquid 131 and fluid 132 are generally different, rise and fall of liquid 131 within tubular columns 70 will cause variations in the hydrostatic pressure within conduits 111 and 112 at the level of position indicator 120; a measure of the height of liquid 131 within the tubular columns is thereby obtained from the position indicator. The space within inner tube 124 is also filled with fluid 132, which is circulated therethrough for cooling purposes, the fluid entering tubular column 70 through inlet 127, flowing upwardly through space 123a passing laterally through perforations 125 and 126 flowing downwardly through inner tube 124, and exiting at outlet 128. This flow of fluid 132 that is used for cooling purposes is seen, therefore, not to affect the height of neutron-absorbing liquid in space 124a.

As may be readily seen now by considering Figs. 13 and 14 in conjunction with one another, if it is desired to increase the degree of neutron absorption within core 44, pump 115 is made to force fluid 132 upwardly toward tank 116 and downwardly in the vertical portion of conduit 112 and to the right therein as viewed in Fig. 14. Such pumping action will force neutron-absorbing liquid 131 upwardly in space 124a and will force fluid 132 in the upper portion of space 124a through perforations 125 and downwardly through space 123a into conduit 111; consequently the net result will be an increase in the quantity of neutron-absorbing liquid 131 in core 44. Conversely, when it is desired to increase the reactivity in core 44, pump 116 is made to force fluid 132 downwardly in the vertical portion of conduit 111 and to the right therein as viewed in Fig. 14, whereupon fluid 132 is forced from space 123a through the perforations 125 into space 124a, thereby forcing neutron-absorbing liquid 131 in space 124a downwardly into conduit 112; the degree of neutron absorption in core 44 is consequently reduced and the reactivity in the core is enhanced.

Referring now to Fig. 15, where the over-all energy conversion system of the present invention is shown schematically, steam outlet conduit 58 which is connected to the upper portion of core 44 through vessel 20 is seen to lead into the inlet side of a turbo-generator 140 through a throttle valve 142; a bypass line 143 having a normally closed valve 144 is also connected to conduit 58 in parallel with the turbo-generator. A line 145 leads from the outlet side of turbo-generator 140 into the inlet side of a condenser 146; a line 147 connects the outlet side of the condenser to a pump 148 which returns condensed moderator-coolant to upper plenum 40 in vessel 20. Moderator outlet conduit 56 is seen to lead from lower plenum 42 into the inlet side of a drain tank 149 through a valve 150; a line 151 connects the outlet side of the drain tank to a pump 152 which is coupled by a line 153 to a purifier 154. Moderator inlet conduit 54 is connected to the outlet side of purifier 154, thereby completing the circuit for the return of moderator-coolant to upper plenum 40 in vessel 20.

In operation, the moderator-coolant in upper plenum 40 is forced, due to the pressure differential caused by pumps 148 and 152 and the hydrostatic pressure in upper plenum 40, downwardly into the interior of trains 45 where the moderator-coolant is heated. The moderator-coolant within trains 45 being under substantial pressure is maintained as a liquid therein; upon being forced through orifices 84 in connectors 82 liquid is sprayed or aspirated against the hot outer walls of the trains where it is converted into superheated vapor which passes upwardly through spaces 88 between the trains into steam outlet conduit 58 and into turbo-generator 140 to drive the latter. Since the liquid moderator-coolant entering guide tubes 85 of trains 45 from upper plenum 40 is cool relative to the vapor at the upper portion of spaces 88 between the trains, condensation of the vapor within the spaces upon the outer walls of the guide tubes would occur were it not for insulation 89. Insulation 89 is appreciated therefore as being contributory to increasing the efficiency of the energy conversion process. Thermostatic gates 104 provided in the lower ends of trains 45 open and close with the temperature of the liquid within the lower portion of the trains. When the liquid within trains 45 reaches a preset temperature, gates 104 in nozzles 98 will open and permit the pressurized moderator-coolant within the trains to issue downwardly against screen 52, the decrease in pressure causing a portion of the liquid to be flashed into vapor which passes upwardly into spaces 88 between the trains and is superheated before passing into steam outlet conduit 58 and turbo-generator 140. Gates 104 are generally set to permit only a small quantity of liquid from within trains 45 to exit through nozzles 98 of the trains, such quantity being variable to adjust temperature and pressure conditions within core 44. But in the event that orifices 84 in connectors 82 become partially or totally clogged so as to prevent passage of liquid from the interior of the trains to spaces 88 therebetween, the temperature of the liquid within the trains will rise and cause thermostatic gates 104 to open fully. Gates 104 in nozzles 98, therefore, are seen to be safety devices to prevent damage to fuel elements 80 and core 44. As long as the temperature of the pressurized liquid within trains 45 does not exceed the temperature at which gates 104 are set to open fully, the major moderator-coolant flow will take place through orifices 84 and only a minor passage will take place through nozzles 98 of trains 45. It is to be appreciated, of course, that the farther down on trains 45 that the liquid passes through orifices 84, the higher the temperature of the liquid and the greater will be the length of path that the vapor in spaces 88 between the trains has to travel before exiting at the steam outlet conduit 58. Orifices 84 may be made to increase in number and size on each connector 82 in progressing down trains 45 or orifices may be omitted completely on the upper connectors to optimize the overall quality of steam exiting from core 44 in view of this consideration. Ideally, the design variables are adjusted to supply superheated vapor to turbo-generator 140 for optimum efficiency. It is patent now that, by virtue of the present invention, a relatively small quantity of liquid per unit volume of vapor formed will be required to be circulated by pump 152, for almost all of the pressurized liquid that is passed through orifices 84 will be converted into vapor. That portion of the liquid moderator passing from within trains 45 through orifices 84 into spaces 88 between the trains that is not converted into vapor will gravitate to screen 52 into lower plenum 42 and be circulated by pump 152 back to upper plenum 40.

Orifices 84, as shown in Fig. 12, should direct pressurized liquid outwardly from trains 45 in a nonradial direction to avoid perpendicular bombardment of adjacent trains and the consequent erosion thereof. Preferably, liquid sprayed from orifices 84 alights on adjacent trains 45 with a glancing blow; to achieve such a result, the liquid may be directed upwardly or downwardly coupled with the orientation indicated by Fig. 12, indicated by Fig. 12, to impart a spiral motion to the liquid.

During shutdown for loading and unloading operations, valve 150 is closed causing spaces 88 in core 44 to be filled with moderator-coolant from drain tank 149. This operation serves a dual purpose. First, it increases the moderator-to-fuel ratio within core 44 to such a degree that the reactor cannot be made critical, thereby acting as a shutdown safety control. Secondly, fission product decay heat can be removed by circulation of moderator-coolant through steam outlet conduit 58, bypass line 143, valve 144, line 145, condenser 146, line 147, pump 148, moderator inlet conduit 54, upper plenum 40, trains 45, orifices 84, and spaces 88.

The nuclear reactor of the present invention is further recognized to have a direct response to increased power demand when consideration is made of the phenomena which occur when the electrical demand on turbo-generator 140 is increased. As the generator of turbo-generator 140 becomes burdened, throttle valve 142 which monitors the flow of steam to the turbine of the turbo-generator will open in order to keep the angular velocity of the turbo-generator at a preset value. As throttle valve 142 to the turbine of turbo-generator 140 opens, the pressure in the steam outlet conduit 58 and in spaces 88 between trains 45 will be reduced, thereby creating a greater pressure differential between the inside of the trains and the spaces therebetween and causing the flow rate of liquid to increase within the trains and through orifices 84 into the spaces between the trains. Since an increased flow rate of liquid through trains 45 will reduce the temperature of fuel elements 80, the reactivity in core 44 will increase because of the negative temperature coefficient of reactivity. The increased reactivity of the reactor in response to an increased power demand will increase the rate of conversion of nuclear energy to heat energy and, in turn, to electrical energy. Conversely, the nuclear reactor of the present invention will have a direct response to a decreased power demand. Thus, one of the merits of the subject invention over conventional boiling water reactors, which respond inversely to increases and decreases in power demand, is readily comprehended.

The nuclear reactor of the present invention is also seen to retain the inherent safety of the boiling water reactor; should orifices 84 become clogged and should gates 104 also fail to open causing the temperature of core 44 to rise rapidly, vapor will form within trains 45, the vapor-to-liquid ratio, and consequently the fuel-to-moderator ratio, within the trains will increase, and the degree of neutron moderation will decrease thereby lowering the reactivity of the reactor and ultimately quenching the neutronic chain reaction. Since the liquid circulation requirements of the present invention are relatively small per unit volume of vapor formed, the net efficiency of the over-all energy conversion system herein disclosed is substantially higher than in boiling water reactor systems. The subject invention, of course, dispenses with heat exchangers, well known as the most salient advantage of boiling water reactors.

Reflection upon the construction of core 44 and the dynamic conditions prevailing therein will vivify the merits thereof. Due to the fact that trains 45 are hung from plates 76 which in turn are supported by upper grid 48, bowing and twisting of the trains is inhibited by the gravitational forces acting on the mass of the trains and on the mass of the liquid therein. Since the pressure within trains 45 is greater than the pressure outside the trains, a continuous outwardly directed net force acts on the inner walls of the trains and maintains their circular cross section, i.e. the cross section of maximum area. The longitudinal striations or grooves in the surfaces of fuel material 94, not visible from the drawings but previously adverted to, permit temperature and nuclear growth within fuel elements 80 without causing damage to sheaths 90 and 92 of the fuel elements since the annuli of fuel material will readily fracture and shift within the sheaths in response to external and internal forces. Due to the fact that each train 45 consists of a plurality of small divorced fuel elements 80, a defect in any one fuel element 80 will not affect the remainder of the train; the effect of the defect on the nuclear characteristics of the reactor and the contamination of moderator-coolant will therefore be minimal. Dimensional changes in trains 45 are likewise free to take place without adverse effects since fuel assemblies 74 are bound in only one plane, i.e. at the guide tubes 85 within plates 76. However, the guide tubes which are the only bound part of trains 45 do not experience nuclear growth and are relatively cool at all times, so that the active portion of core 44 may be viewed as being freely suspended. Core 44 is further capable of criticality using fuel material 94 of natural or low-enrichment uranium.

The inherent stability of the present energy conversion system as contrasted with the instability of present boiling water reactors is readily appreciated when it is borne in mind that the moderator-coolant within trains 45 is always in the liquid state. Variations in vapor density and quality within spaces 88 have only a small effect on the reactivity of the nuclear reactor thereby necessitating only minor activity by the control system to maintain a preset power level.

The closed-loop liquid neutron-absorber control system incorporated in the subject nuclear reactor that has been described previously in detail may be utilized in other reactors where a safe, efficient, uncomplicated, and elegant neutron-absorber means of control is desired.

Having described and illustrated the present invention, the design details of a preferred embodiment thereof are now presented:

Operating characteristics
Heat released in core ____ 1000 mw.
Max. heat flux _____ 256,000 B.t.u./ft.$^2$/hr.
Ave. heat flux _____ 90,000 B.t.u./ft.$^2$/hr.
Ratio of max. to ave. heat flux _____ 2.85.
Power density in core (reflector incl.) _____ 0.85 mw./ft.$^3$
Max. neutron flux _____ $4 \times 10^{13}$ neutrons/cm.$^2$/sec.
Max. fuel temperature __ 1200° F.
Ave. fuel element surface temperature _____ 750° F.

Moderator-coolant
Material _____ $H_2O$.
Inlet temperature, $H_2O$ _ 400° F.
Outlet temperature, $H_2O$ _ 486° F.
Outlet temperature, steam _____ 650° F.
Inlet pressure _____ 610 p.s.i.
Outlet pressure _____ 600 p.s.i.
Velocity of $H_2O$ _____ 10 ft./sec.
Flow rate _____ 1,455 tons/hr.
Weight _____ 6.1 tons.

Structural elements
Vessel _____ Steel clad with stainless steel.
Height of vessel _____ 35 ft.
I.D. of vessel _____ 13.5 ft.
Thickness of vessel ____ 6.0 in.
Height of upper plenum _ 16.0 ft.
Height of lower plenum __ 6.0 ft.
Height of core _____ 13.0 ft.
Blast shield _____ Steel.
Thickness of blast shield _ 6 in.
Thermal shield _____ Glass fiber.
Thickness of thermal shield _____ 1.0 ft.
Biological shield _____ Concrete and steel.
Thickness of biological shield _____ 8 ft.

Core
Core diameter (incl. reflector) _____ 13.5 ft.
Core height _____ 13.0 ft.
Reflector material _____ Graphite.
Reflector thickness ____ 1.0 ft.
No. of fuel element trains _____ 25,600
Length of trains _____ 13.5 ft.
O.D. of trains _____ 0.500 in.
I.D. of trains _____ 0.350 in.
No. of fuel elements in train _____ 11.0.
Length of fuel elements __ 12.0 in.
Fuel material _____ Uranium—1.2% $U^{235}$.
Thickness of fuel material _____ 0.045 in.
O.D. of fuel material ____ 0.470 in.
I.D. of fuel material ____ 0.380 in.
Length of fuel material in element _____ 11.0 in.
Inner and outer sheaths __ Zirconium.
Thickness of inner and outer sheaths _____ 0.010 in.
Bonding agent _____ Sodium-potassium.
Thickness of bonding agent _____ 0.005 in.
Connectors _____ Zirconium.

| | |
|---|---|
| No. of connectors | 11.0. |
| Length of connectors | 1.0 in. |
| No. of orifices in each connector (top connector has no orifices) | 2.0. |
| Orifice diameters | 0.020 in. |
| Guide tubes | Stainless steel. |
| Length of guide tubes | 1.5 ft. |
| O.D. of guide tubes with insulation | 0.620 in. |
| I.D. of guide tubes | 0.350 in. |
| Insulation on guide tubes | Silicon carbide. |
| Thickness of insulation | 0.135 in. |
| Nozzles | Stainless steel. |
| Length of nozzles | 6.0 in. |
| O.D. of nozzles | 0.620 in. |
| I.D. of nozzles | 0.350 in.–0.500 in. |
| Temperature setting on gates | 490° F. |

Liquid neutron-absorber columns

| | |
|---|---|
| No. of columns | 65. |
| Height of columns (inside vessel) | 19 ft. |
| O.D. of outer tube | 2.20 in. |
| I.D. of outer tube | 2.12 in. |
| O.D. of median tube | 1.92 in. |
| I.D. of median tube | 1.84 in. |
| O.D. of inner tube | 1.54 in. |
| I.D. of inner tube | 1.46 in. |
| Tube material | Zirconium. |
| Pressure fluid | $D_2O$. |
| Neutron-absorber material | 95% Hg–5% Cd. |
| Neutron-absorber melting point | 50° F. |

It is intended that the present invention be limited only by the scope of the following claims, rather than by the specific details previously described and illustrated.

What is claimed is:

1. A nuclear reactor comprising a vessel adapted to contain fluid under pressure, a core, a first plenum disposed above said core and a second plenum disposed below said core, said core comprising a plurality of spaced tubular fuel element trains containing material fissionable by thermal neutrons and having a plurality of orifices therethrough to provide communication between the interiors of said trains and the spaces therebetween, each of said trains being open at its upper end to provide communication between said first plenum and the interior of the train and having a controllable gate at the bottom end, a plate sealing the first plenum from the spaces between the fuel element trains in the core and having a plurality of holes each receiving the upper end of a fuel element train, said second plenum being in communication with the spaces between said trains, a fluid moderator disposed within the first plenum, the interiors of the trains and the second plenum, and means to maintain the moderator fluid within said first plenum and the interiors of said trains under pressure.

2. A nuclear reactor as specified in claim 1, said reactor further comprising a vapor outlet connected to the vessel adjacent to the upper ends of the trains and below the plate to provide communication between the spaces between the trains and a region outside the vessel.

3. A nuclear reactor as specified in claim 2, the tubular fuel element trains each comprising a plurality of tubular fuel elements disposed in tandem, a tubular connector having orifices and disposed between adjacent fuel elements and joined thereto, an insulated guide tube joined to one end of the plurality of fuel elements and having a flanged portion at the end thereof that is remote from the plurality of fuel elements, and an annular housing joined to the end of the plurality of fuel elements remote from the guide tube, the said gate being disposed within the housing and joined thereto, the gate further being operable to open and close the end of the train in response to temperature.

4. A nuclear reactor as specified in claim 3, said reactor further comprising a plurality of tubular columns disposed between the fuel element trains, a source of fluid neutron-absorber connected to the columns, and means to cause a variable quantity of the neutron-absorber to reside within the columns, each column comprising a closed outer tube, a median tube disposed within the outer tube and spaced therefrom, one end of the median tube being perforated and joined to the end of the outer tube remote from the said source connection, and an inner tube disposed within the median tube and spaced therefrom, the end of the inner tube remote from the source connection being joined to the outer tube, and the end of the inner tube nearest the source connection being closed.

5. A fuel element train for a nuclear reactor comprising a plurality of tubular fuel elements disposed in tandem and a tubular connector disposed between and joined to the proximate ends of adjacent fuel elements, at least one of said connectors having an orifice provided in the side thereof.

6. A fuel element train as specified in claim 5, one of the tubular fuel elements having a gate mounted therein to prevent transmission of fluid therethrough, said gate operating at a preset temperature to permit transmission of fluid through the interior of the fuel element.

References Cited in the file of this patent

UNITED STATES PATENTS

| | | |
|---|---|---|
| 2,782,158 | Wheeler | Feb. 19, 1957 |
| 2,806,820 | Wigner | Sept. 17, 1957 |
| 2,825,688 | Vernon | Mar. 4, 1958 |

FOREIGN PATENTS

| | | |
|---|---|---|
| 1,027,338 | Germany | Apr. 3, 1958 |

OTHER REFERENCES

TID–7529 (Pt. 1) Book I, P. 254, November 1957.

Proceedings of the International Conference on the Peaceful Uses of Atomic Energy, vol. III, Geneva, Aug. 8–20, 1955, New York, United Nations, 1956, p. 244 (article by Dahl et al.).

Proceedings of the International Conference on the Peaceful Uses of Atomic Energy, held in Geneva, Aug. 8–20, 1955, vol. II, New York, United Nations, 1956, p. 345, article by Yvon.